United States Patent [19]
Bechamps

[11] Patent Number: 5,553,183
[45] Date of Patent: Sep. 3, 1996

[54] APPARATUS FOR AND METHODS OF SPLITTING FIBER OPTIC SIGNALS

[75] Inventor: Ronald D. Bechamps, Jackson, N.J.

[73] Assignee: ANTEC Corp., Rolling Meadows, Ill.

[21] Appl. No.: 415,194

[22] Filed: Apr. 3, 1995

[51] Int. Cl.⁶ .................................................. G02B 6/255
[52] U.S. Cl. .............................. 385/95; 385/97; 385/135
[58] Field of Search ........................ 385/95–99, 133–139, 385/24

[56] References Cited

U.S. PATENT DOCUMENTS 5,074,635  12/1991  Justice et al. ............................. 385/95
5,375,185  12/1994  Hermsen et al. ........................ 385/135

Primary Examiner—John D. Lee
Assistant Examiner—Phan T. H. Palmer
Attorney, Agent, or Firm—R. Gale Rhodes, Jr.

[57] ABSTRACT

Apparatus and method of providing a fiber optic signal splitter for receiving an incoming fiber optic signal and for splitting the signal into a first plurality of signals, fiber optic splicing apparatus for splicing the first plurality of fiber optic signals to fiber optic splitter apparatus which splits the first plurality of signals into a second plurality of signals greater in number than the first plurality of signals. Combination fiber optic splice tray for splicing an incoming optical fiber to apparatus for splitting optical fiber signals received over the incoming optical fiber.

13 Claims, 4 Drawing Sheets

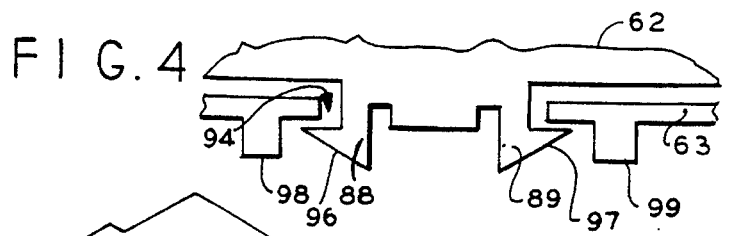
FIG. 4
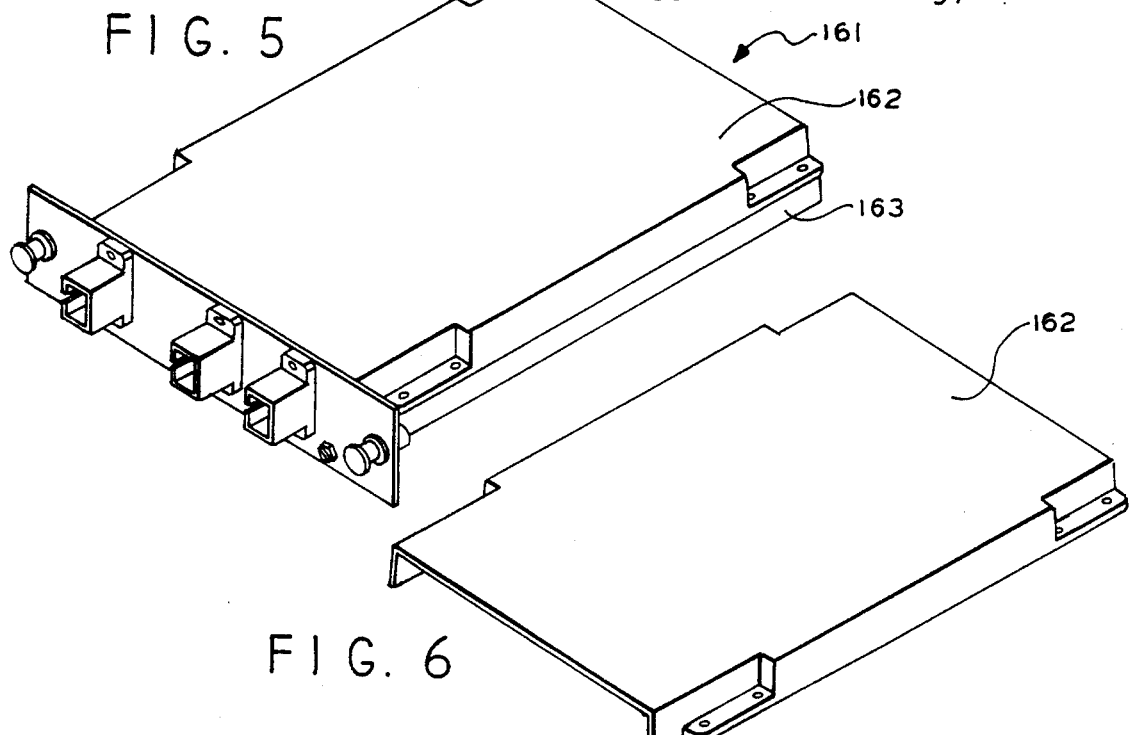
FIG. 5
FIG. 6
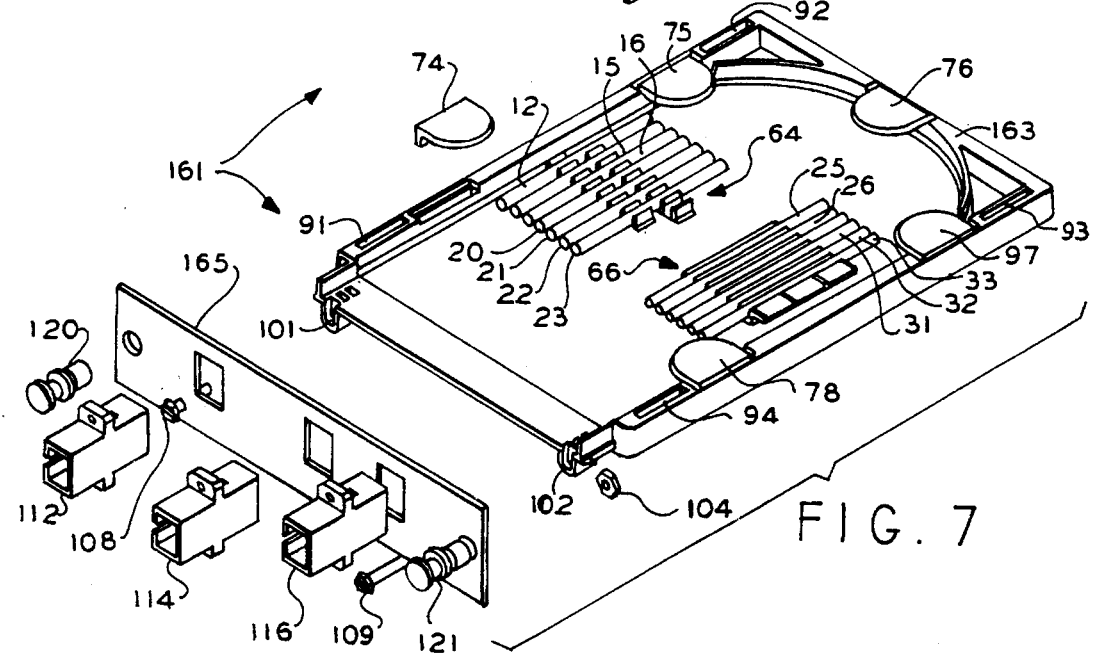
FIG. 7

APPARATUS FOR AND METHODS OF SPLITTING FIBER OPTIC SIGNALS

BACKGROUND OF THE INVENTION

The present invention relates to apparatus and methods for splitting fiber optic signals which signals, as known to those skilled in the art, are signals transmitted through optical fibers.

Numerous fiber optic signal splitters are known to the art, and numerous apparatus and devices are known to the art for organizing and storing spliced optical fibers. U.S. Pat. No. 5,375,185, entitled APPARATUS FOR STORING AND ORGANIZING SPLICED OPTICAL FIBERS, patented Dec. 20, 1994, Eric J. Hermsen et al., inventors, and assigned to the same assignee as the present invention, discloses such apparatus. This patent is hereby incorporated herein by reference as if fully reproduced herein and is referred to hereinafter as "the '185 patent."

Although the prior art is replete with many devices, it is believed that there is a need for a new and improved apparatus for and methods of splitting fiber optic signals and for new and improved combination apparatus for splitting fiber optic signals and a splice tray or splice apparatus.

SUMMARY OF THE INVENTION

It is the object of the present invention to satisfy the foregoing need in the art.

Apparatus satisfying the foregoing object and embodying the present invention may include fiber optic signal splitter apparatus for receiving an incoming fiber optic signal and for splitting the incoming fiber optic signal into a first plurality of fiber optic signals, fiber optic splicing apparatus for splicing the first plurality of fiber optic signals to the fiber optic signal splitter apparatus which splits the first plurality of fiber optic signals into a second plurality of fiber optic signals greater in number than the first plurality of fiber optic signals. The present invention further includes such fiber optic signal splicing apparatus in combination with a splice tray for splicing an incoming optical fiber to the apparatus and for splicing a plurality of optical fibers to receive the second plurality of optical fiber signals.

Method satisfying the foregoing object and embodying the present invention may include the steps of splitting an incoming fiber optic signal into a first plurality of fiber optic signals, splicing the first plurality of fiber optic signals to a plurality of optic fiber signal splitters equal in number to the first plurality of fiber optic signals to cause the plurality of fiber optic signal splitters to split the first plurality of fiber optic signals into a second plurality of fiber optic signals larger in number than the first plurality of fiber optic signals.

DESCRIPTION OF THE DRAWINGS

FIG. 4 is a partial vertical view illustrating the substantially non-removable attachment of the cover to the base shown in FIG. 3;

FIG. 5 is a perspective view of an alternate embodiment of fiber optic signal splitter apparatus of the present invention;

FIG. 6 is a perspective view of the cover of the apparatus of FIG. 5;

FIG. 7 is an exploded view in perspective of the base of the apparatus shown in FIG. 5.

DESCRIPTION OF THE PREFERRED EMBODIMENTS

Figure 1:
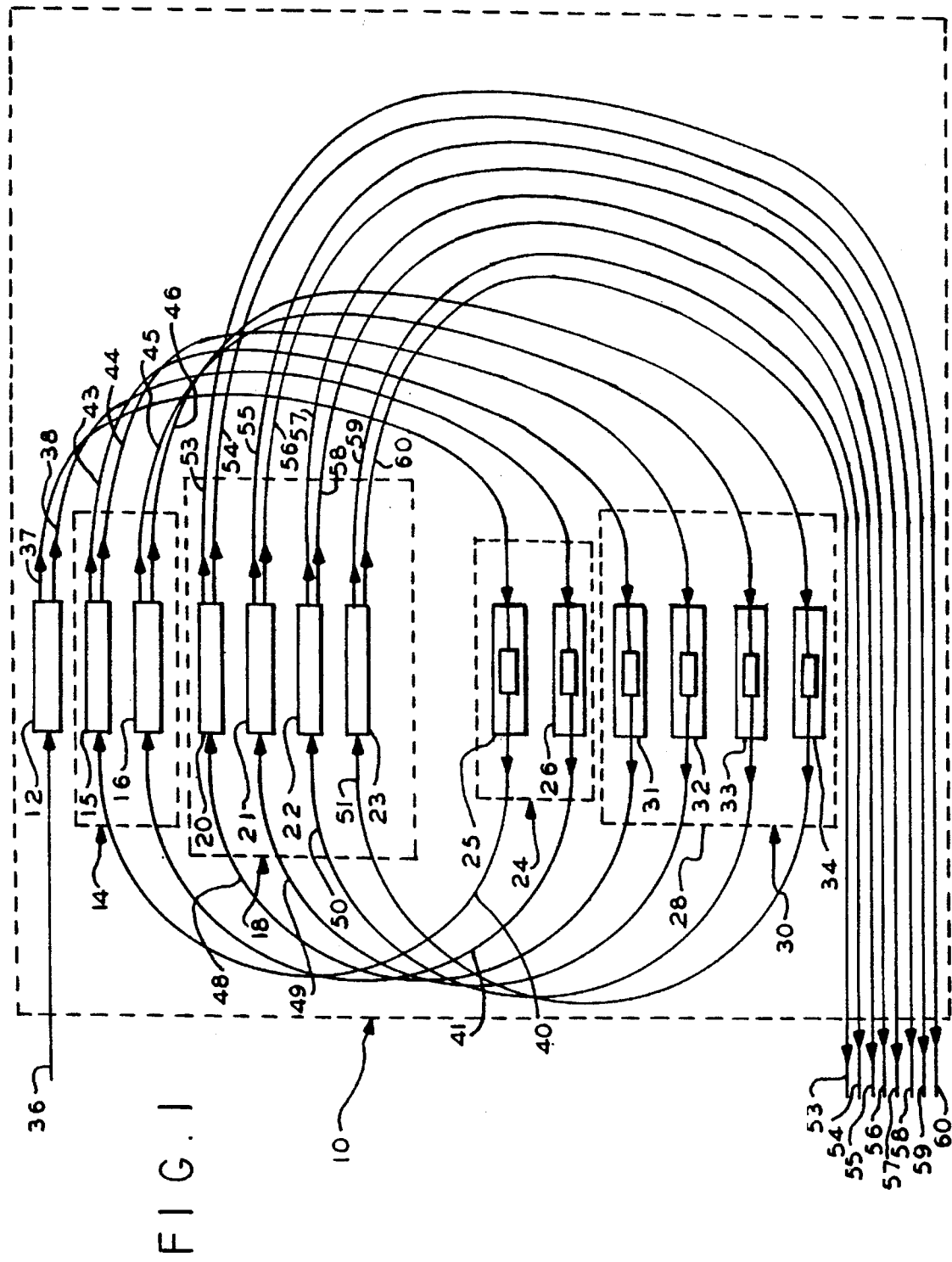
FIG. 1 is a diagrammatical illustration of an embodiment of fiber optic signal splitter apparatus of the present invention.

Referring now to FIG. 1, a preferred embodiment of fiber optic signal splitter apparatus of the present invention is illustrated diagrammatically and indicated by general numerical designation 10. Apparatus 10 includes an individual fiber optic signal splitter 12, a first plurality of fiber optic signal splitters indicated by general numerical designation 14 and including individual fiber optic signal splitters 15 and 16, a second plurality of fiber optic signal splitters including a plurality of individual fiber optic signal splitters 20–23, a first plurality of fiber optic splicing means or members indicated by general numerical designation 24 and including individual fiber optic splicing means or members 25 and 26 and a second plurality of fiber optic splicing means or members indicated by general numerical designation 30 and including individual fiber optic splicing means or members 31–34. In this preferred embodiment, the individual fiber optic splitters are 1 to 2 splitters, and the individual fiber optic splicing means or members are single fusion optical fiber splices.

Individual optical fiber signal splitter 12 includes an input lead 36 and a pair of output leads 37 and 38. An incoming fiber optic signal is transmitted through the input lead 36 and the splitter 12 splits the incoming fiber optic signal into a pair of outgoing fiber optic signals transmitted through the output leads 37 and 38. Output leads 37 and 38 are spliced respectively by individual optical fiber splicing members 25 and 26 to the input leads 40 and 41 of individual fiber optic signal splitters 15 and 16, respectively. Upon the pair outgoing fiber optic signals from the individual splitter 12 being received by the pair of fiber optic signal splitters 15 and 16, the splitters 15 and 16 split such signals into four outgoing fiber optic signals transmitted through the pairs of output leads 43 and 44 and 45 and 46 of the respective splitters 15 and 16. The output leads 43–46 are spliced, respectively, by the individual optical fiber splicing members 31–34 to the input leads 49–51 of the respective individual fiber optic signal splitters 20–23. Upon the four fiber optic signals from the fiber optic signal splitters 15 and 16 being received by the fiber optic signal splitters 20–23, the four fiber optic signals are split into eight outgoing fiber optic signals transmitted through the pairs of output leads 53 and 54, 55 and 56, 57 and 58 and 59 and 60 of the fiber optic signal splitters 20–23. These output leads 53–60, note the lower lefthand portion of FIG. 1, present the eight fiber optic signals for connection to fiber optic signal utilization devices or apparatus such as telephone equipment, television equipment, data equipment and the like.

It will be understood that the first plurality of fiber optic signal splitters 14 may comprise an additional number or numbers of individual fiber optic signal splitters and in such event the number of individual fiber optic signal splitters comprising the second plurality of fiber optic signal splitters 18 and the pluralities of individual splicing members comprising the first and second pluralities of fiber optic splicing means 24 and 30 will be increased in number accordingly. It will be further understood that the individual fiber optic signal splitter 12 may be of the type which splits incoming fiber optic signals into three or more outgoing fiber optic signals, and in such event it will be understood that the pluralities of fiber optic signal splitters of the pluralities 14 and 18 and the pluralities of the fiber optic splicing members of the pluralities 24 and 30 will be increased in number accordingly. Referring again to FIG. 1, it will be understood that instead of providing eight output fiber optic signals as described above, fiber optic signal splitter apparatus according to the present invention may include only the individual splitter 12, the first plurality of optical fiber signal splitters 14 and the first plurality of optical fiber splicing means 24 whereby the four output leads 43–46 of the individual fiber optic signal splitters 15 and 16 will provide four outgoing fiber optic signals from which the incoming fiber optic signal received on input lead 36 is split.

Figure 2:
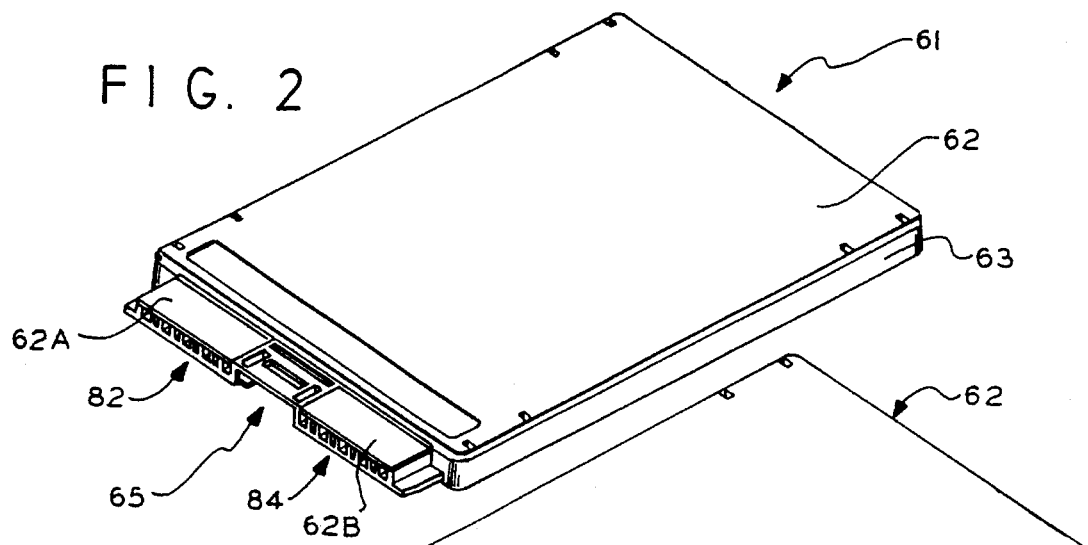
FIG. 2 is a perspective view of an actual embodiment of fiber optic signal splitter apparatus of the present invention.

Referring now to FIG. 2, an actual embodiment of fiber optic signal splitter apparatus embodying the present invention is illustrated and indicated by general numerical designation 61. As may be better understood from FIG. 3, apparatus 61 includes a cover indicated by general numerical designation 62 and a base indicated by general numerical designation 63, apparatus 61 has an entrance end indicated by general numerical designation 65. The cover 62 is mounted to the base 63 to provide the unitary apparatus 61, or the assembly, shown in FIG. 2. It will be understood that the fiber optic signal splitters and fiber optic splicing means shown in FIG. 1 are also shown in FIG. 3 and given the same numerical designations for convenience of reference.

Referring again to FIG. 3, it will be understood that the base 63 has an entrance end indicated by general numerical designation 67 and is provided with first mounting means, or splitter holder, indicated by general numerical designation 64 and second mounting means, or splice holder, indicated by general numerical designation 66. Mounting means 64 is comprised of a plurality of pairs of upwardly extending and opposed members, such as for example representative pair of upwardly extending and opposed members 68 and 69 for wedgedly and removably receiving fiber optic signal splitter 23.

Mounting means 66 may comprise an integrally formed member 70 which may be formed of a suitable flexible material such as a suitable thermoplastic elastomer and may be made by a suitable molding operation such as suitable injection molding; the bottom of the member 70 may be mounted to the base 63 by a suitable adhesive. The member 70 provides a plurality of inwardly extending grooves, as shown, for wedgedly and removably receiving the fiber optic splicing means 25 and 26 and 31–34. The base 63 may be provided with a plurality of optical fiber retaining members 74–79, mounted removably to the base 63, for facilitating retention of the input and output leads, shown in FIG. 1 and described above, on the base means 63. The retaining members 74–79 may have the same structure as the retaining members 35–42 described in the '185 patent and shown particularly in FIG. 3 of the '185 patent. It will be further understood that the retaining members 74–79 may have either the structure shown for the representative retaining member 42 in FIG. 5, or in FIG. 5A, of the '185 patent. Further, the base 63 may be provided with a generally semi-circular curvature imparting member 80 for imparting a radius of curvature to the output leads shown in the righthand portion of FIG. 1, which radius of curvature is less than the minimum bending radius for such fiber optic output leads.

Figure 3:
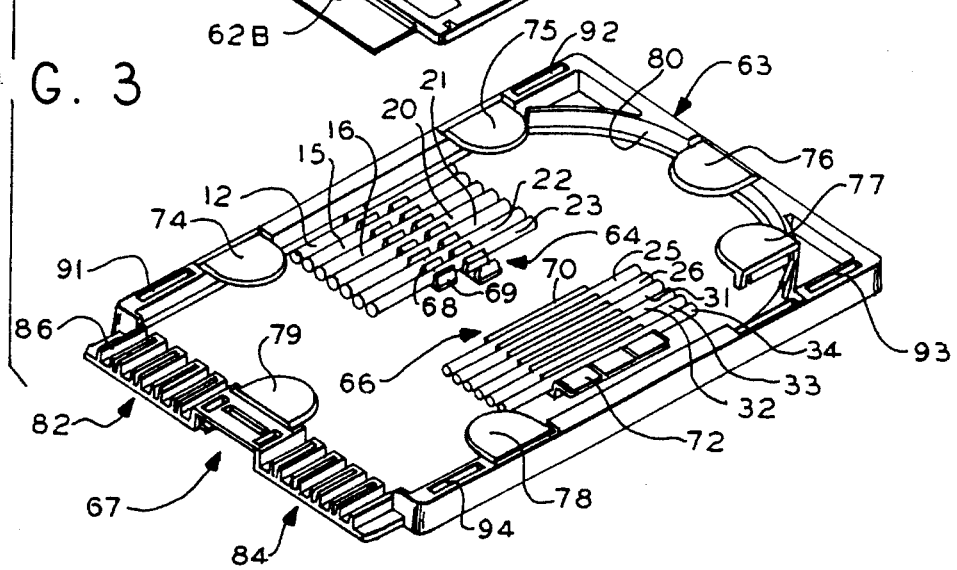
FIG. 3 is an exploded perspective view of the cover and base comprising the apparatus of FIG. 2.
Figure 3A:
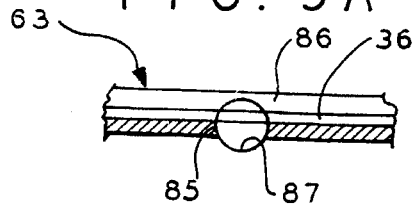
FIG. 3A is a partial vertical view, in cross-section, of a groove provided in the base shown in FIG. 3 and illustrating strain relief.

Base 63 further includes pluralities of upwardly extending members indicated by general numerical designations 82 and 84, FIG. 3, which provide a plurality of grooves therebetween for receiving the input lead 36, FIG. 1, and the output leads 53–60, FIG. 1. The input lead 36, FIG. 1, may enter the groove 86 and the output leads 53–60, FIG. 1, may exit the other grooves provided by the plurality of upwardly extending members 82 and 84 with an extra groove being provided. As shown in FIG. 3A, with regard to representative groove 86, the grooves may be provided with a cavity, e.g. cavity 87, for receiving a suitably epoxy 85 which surrounds the input and output filter optic leads, e.g. input lead 36, hardens and provides strain relief thereby substantially preventing a pulling force applied to the end of the input lead 36 from pulling such lead out of the splitter 12 (FIG. 1). Cover 62, FIGS. 2 and 3, is provided with a pair of outwardly extending members 62A and 62B for overlying and covering the grooves 82 and 84.

In the preferred embodiment, cover 62 is mounted to the base 63 in a substantially non-removable fashion to provide the closed or unitary apparatus or assembly shown in FIG. 2. The cover 62, FIG. 4, may be provided with four pairs of downwardly extending, slightly flexible, notched members, representative pair of notched members 88 and 89 shown in FIG. 4, for being received and substantially non-removably latched into four openings or holes 91–94 formed in base 63; representative hole or opening 94 is shown in FIG. 4. Upon the cover 62 being moved downwardly into engagement with the base 63, FIG. 3, the downwardly extending members 88 and 89, FIG. 4, are first cammed inwardly towards each other due to their inclined surfaces 96 and 97 engaging the portion of the base 63 surrounding the hole 94 and after the members 88 and 89 are forced through the hole 94 the members 88 and 89 flex outwardly and remain in the positions shown in FIG. 4 to mount the cover 62 to the base 63 in a substantially non-removable manner; members 98 and 99 provided on the base 63 substantially deny access to the members 88 and 89. Accordingly, it will be understood that the cover 62 is mounted to the base 63 in a substantially non-removable manner in the sense that the notched members 88 and 89 must be at least partially destroyed to remove the cover 62 from the base 63. It will be understood that the cover 62 is not mounted substantially non-removably to the base 63 until after the fiber optic signal splitters 12, 15 and 16 and 20–23 and fiber optic splicing means 25 and 26 and 31–34 are mounted to the base and the input and output leads arranged as indicated diagrammatically in FIG. 1.

A further alternate embodiment of fiber optic signal splitter apparatus embodying the present invention is illustrated in FIGS. 5–7 and indicated by general numerical designation 161. It will generally be understood that the cover 162 and base 163 of the apparatus 161 are mounted together in a substantially non-removable manner in the same manner as described above with regard to the cover and base 62 and 63 and as illustrated in FIG. 4. It will be noted that cover 162, FIG. 6, is higher than cover 62, FIG. 3, to accommodate fastening of a panel 165, FIG. 7, to the apparatus 161. It will be further understood that base 163 is substantially the same as base 63 shown in FIG. 3 and described above and that the structural elements in the base 163 which are the same as the structural elements of the base 63 are given the same numerical designations for convenience of reference. Base 163, FIG. 7, differs from base 63 of FIG. 3 in that base 163 is provided with holes or apertures 101 and 102 and a pair of internally threaded nuts, only internally threaded nut 104 being shown in FIG. 7, which nuts reside behind the holes 101 and 102 and threadedly receive a pair of threaded screws 108 and 109 to mount the panel 165 to the base 163 and thereby to the cover 162 upon the cover being mounted to the base 163.

Apparatus 161 further includes a plurality of fiber optic connectors 112, 114 and 116, which may be of the type known to those skilled in the art as SC connectors. In FIG. 7, only three fiber optic connectors are shown, due to space limitation, and it will be understood that upon the apparatus 161 being an embodiment of the fiber optic signal splitter apparatus 10 illustrated diagrammatically in FIG. 1, apparatus 161 would include nine such fiber optic connectors, one for the input lead 36 (FIG. 1) and eight for the output leads 53–60 (FIG. 1). As will be understood by those skilled in the art, the fiber optic connectors, representative connectors 112–116, facilitate connection of the input lead 36, FIG. 1, and the output leads 58–60, FIG. 1, to other optical fibers.

Further, the apparatus 161 may include a suitable pair of quick connect and disconnect members 120 and 121, of the type known to the art, mounted to and extending through the panel 165 to facilitate quick connection and disconnection of the apparatus 161 into a frame or other apparatus.

Figure 8:
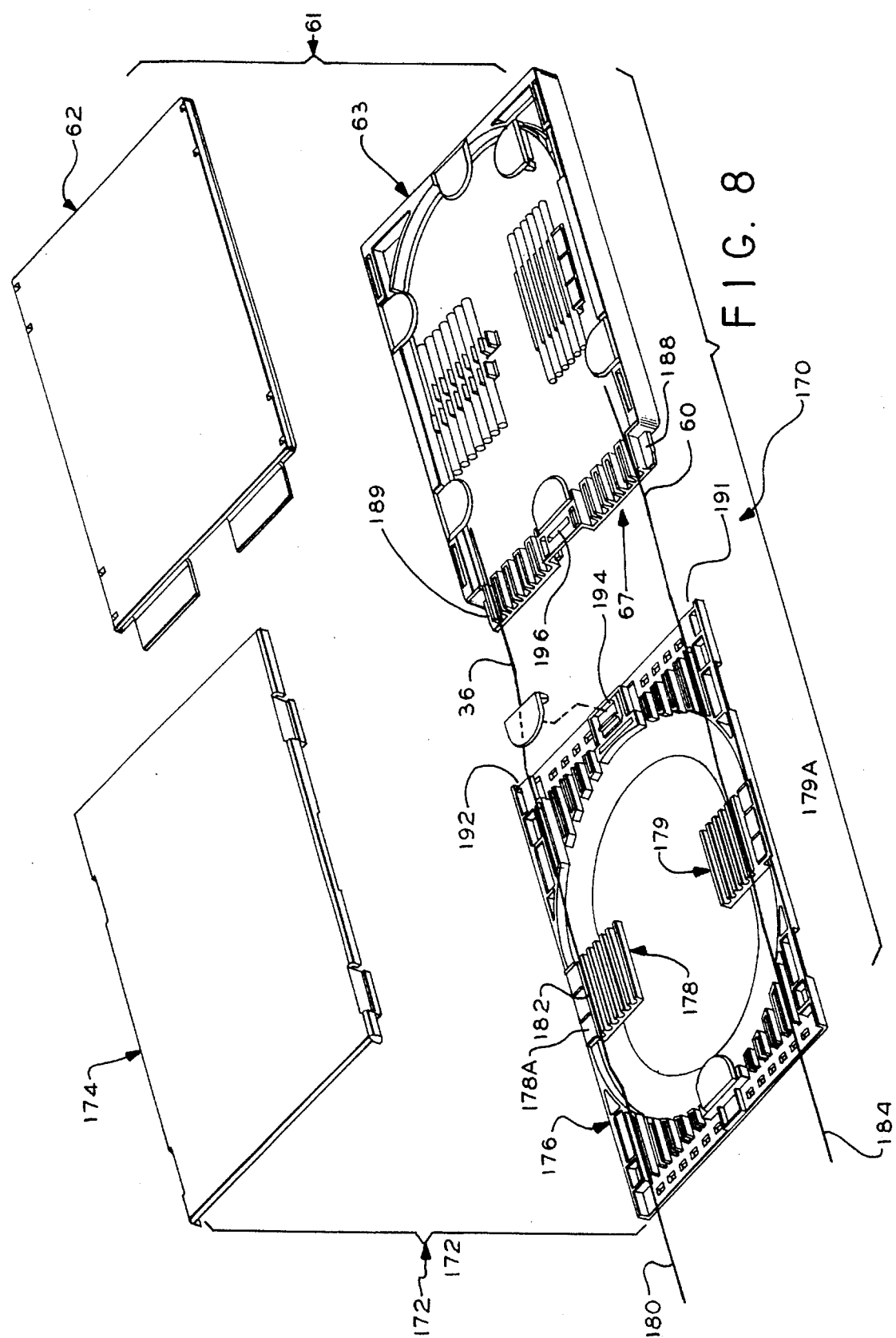
FIG. 8 is an exploded perspective view of a further embodiment of the present invention including in combination the apparatus shown in FIG. 2 and fiber optic splice tray apparatus for organizing and storing spliced optical fibers.

A further embodiment of the present invention is illustrated in FIG. 8 and indicated by general numerical designation 170. This apparatus is combination apparatus including in combination the fiber optic signal splitter apparatus indicated by general numerical designation 61 and shown in FIGS. 2 and 3 and described above and apparatus for storing and organizing spliced optical fibers indicated by general numerical designation 172. It will be generally understood that the apparatus for storing and organizing spliced optical fibers 172 is a reduced in size version of, but otherwise substantially the same as, the apparatus for storing and organizing spliced optical fibers indicated by general numerical designation 10 in the '185 patent. Apparatus 172 includes a cover indicated by general numerical designation 174 and a base indicated by general numerical designation 176, and it will be further understood that the cover 174 is mounted to the base 176 in substantially the same manner that the cover 14 is mounted to the base 12 as illustrated in FIG. 3 of the '185 patent and described in detail therein. The base 176 is provided with a pair of splice holders 178 and 179 for receiving and holding splices between optical fibers entering the apparatus 172 and being spliced to the input fiber optic lead 36 (FIG. 1) and to the output leads 53–60 (FIG. 1). The holders 178 and 179 may include integrally formed and outwardly extending members 178A and 179A, respectively, for overlying and thereby facilitating the retention of the optical fibers on the base 176.

Splices between an optical fiber 180 carrying an incoming fiber optic signal and the input lead 36 to the individual fiber optic splicer 12 (FIG. 1) is illustrated diagrammatically in FIG. 8; the optical fiber 180 would be connected to a source supplying the incoming fiber optic signal. The optic fiber 180 and the input lead 36 are spliced in the apparatus for storing and organizing spliced optical fibers 172 by the splice, such as a single fusion splice, 182 shown in solid outline for convenience of presentation. Similarly, a representative optical fiber 184 is spliced by splice 185 to one of the output leads, such as a representative output lead 60 (FIG. 1) to receive output or outgoing signals transmitted over the output lead 60 (FIG. 1), the optical fiber 184 would be connected, for example, to a utilization device of the types noted above for using the output fiber optic signal.

The base 176 of the apparatus for storing and organizing spliced optical fibers 172 is mounted to the entrance end 67 of the base 63 of the fiber optic signal splitter apparatus 61 by cooperative mounting means provided on the respective apparatus. The cooperative mounting means may include a pair of outwardly extending members 188 and 189 provided on the entrance end 67 of the base 63. The outwardly extending members 188 and 189 are received within grooves 191 and 192 provided at the opposed end of the base 176 and a flexible mounting tab or detent member 194 also is provided on the opposed end of the base 176 for being removably received within an aperture or hole 196 formed on the entrance end of the base 63. The forward end of the flexible tab or detent member 194 is provided with a cam surface, not shown, which upon the tab 194 engaging the front end of the cover 63 causes the tab or detent member 194 to be cammed downwardly after which the tab upon continued movement of the base 176 into engagement with the base 63 flexes upwardly causing the tab 194 to enter the hole 196 and thereby mount the base 176 to the base 63. The base 176 is removed from the base 63 by manually depressing the tab or detent member downwardly and after which bases 176 and 63 are separated by being pulled away from each other.

The covers and bases comprising the above-described apparatus of the present invention may be made from a suitable thermoplastic material and be made by a suitable injection molding process.

It will be understood that many variations and modifications may be made in the present invention without departing from the spirit and the scope thereof.

What is claimed is:

1. Fiber optic signal splitter apparatus, comprising:

fiber optic signal splitter means for receiving an incoming fiber optic signal and for splitting said incoming fiber optic signal into a first plurality of fiber optic signals;

fiber optic splicing means; and said fiber optic splicing means for splicing said first plurality of fiber optic signals to said fiber optic signal splitter means and said fiber optic signal splitter means for receiving said first plurality of fiber optic signals and for splitting said first plurality of fiber optical signals into a plurality of output fiber optic signals greater in number than said first plurality of fiber optic signals.

2. The apparatus according to claim 1 wherein said apparatus further comprises apparatus for storing and organizing spliced optical fibers and wherein said fiber optic signal splitter apparatus and said apparatus for storing and organizing spliced optical fibers are provided with cooperative mounting means for mounting said apparatus for storing and organizing spliced optical fibers to said fiber optic signal splitter apparatus.

3. Fiber optic signal splitter apparatus, comprising:

an individual fiber optic signal splitter for receiving an incoming fiber optic signal and for splitting said incoming fiber optic signal into a first plurality of fiber optic signals;

a first plurality of fiber optic signal splitters equal in number to said first plurality of fiber optic signals and a first plurality of fiber optic splicing fibers equal in number to said first plurality of fiber optic signals, said first plurality of fiber optic splicing members for receiving and splicing said first plurality of fiber optic signals to said first plurality of fiber optic signal splitters and said first plurality of fiber optic signal splitters for receiving and splitting said first plurality of fiber optic signals into a second plurality of fiber optic signals larger in number than said first plurality of fiber optic signals; and a second plurality of fiber optic signal splitters equal in number to said second plurality of fiber optic signals and a second plurality of fiber optic splicing members equal in number to said second plurality of fiber optic signals and said second plurality of fiber optic splicing members for receiving and splicing said second plurality of fiber optic signals to said second plurality of fiber optic signal splitters and said second plurality of fiber optic signal splitters for receiving and splitting said second plurality of fiber optic signals into a plurality of output fiber optic signals greater in number than said second plurality of fiber optic signals.

4. Fiber optic signal splitter apparatus, comprising:

an individual fiber optic signal splitter for receiving and splitting an incoming fiber optic signal into a first plurality of fiber optic signals, said splitter including an input lead through which said incoming fiber optic signal is received and a plurality of output leads equal in number to said first plurality of fiber optic signals and through which said first plurality of fiber optic signals are transmitted;

a plurality of fiber optic signal splitters equal in number to said first plurality of fiber optic signals, each splitter of said plurality of fiber optic signal splitters including an input lead and a plurality of output leads; and a plurality of fiber optic splicing members equal in number to said first plurality of fiber optic signals, each splicing members of said first plurality of splicing means for splicing an output lead of said individual fiber optic signal splitter to an input lead of one of said fiber optic signal splitters of said plurality of fiber optic signal splitters whereby said plurality of fiber optic signal splitters receives and splits said first plurality of fiber optic signals into a plurality of output fiber optic signals greater in number than said first plurality of fiber optic signals, said second output leads of said splitters of said plurality of fiber optic signal splitters equal in number to said plurality of output fiber optic signals and said plurality of output fiber optic signals transmitted through said output leads of said plurality of fiber optic signal splitters.

5. Fiber optic signal splitter apparatus, comprising:

an individual fiber optic signal splitter for receiving and splitting an incoming fiber optic signal into a first plurality of fiber optic signals, said splitter including an input lead through which said incoming fiber optic signal is received and a plurality of output leads equal in number to said first plurality of fiber optic signals and through which said first plurality of fiber optic signals are transmitted;

a first plurality of fiber optic signal splitters equal in number to said first plurality of fiber optic signals, each splitter of said second plurality of fiber optic signal splitters including an input lead and a plurality of output leads;

a first plurality of fiber optic splicing members equal in number to said first plurality of fiber optic signals, each splicing members of said first plurality of splicing members for splicing an output lead of said individual fiber optic signal splitter to an input lead of one of said fiber optic signal splitters of said first plurality of fiber optic signal splitters to cause said first plurality of fiber optic signal splitters to split said first plurality of fiber optic signals into a second plurality of fiber optic signals greater in number than said first plurality of fiber optic signals upon said first plurality of fiber optic signals being received over said input leads of said first plurality of fiber optic signal splitters;

a second plurality of fiber optic signal splitters equal in number to said second plurality of fiber optic signals, each splitter of said second plurality of fiber optic signal splitters including an input lead and a plurality of output leads;

a second plurality of fiber optic splicing members equal in number to said second plurality of fiber optic signals, each splicing members of said second plurality of splicing members for splicing an output lead of one of said splitters of said first plurality of fiber optic signal splitters to an input lead of one of said splitters of said second plurality of fiber optic signal splitters, and upon said second plurality of fiber optic signals being received over said input leads of said second plurality of fiber optic signal splitters said second plurality of fiber optic signal splitters split said second plurality of fiber optic signals into a plurality of output fiber optic signals greater in number than said second plurality of fiber optic signals; and said output leads of said splitters of said second plurality of fiber optic signal splitters equal in number to said plurality of output fiber optic signals and said plurality of output fiber optic signals transmitted through said output leads of said second plurality of fiber optic signal splitters.

6. The apparatus according to claim 5 wherein said apparatus further comprises a housing including a base and a cover mounted to the base, said base provided with first mounting means for mounting said individual fiber optic signal splitter and said first and second pluralities of fiber optic signal splitters to said base, and second mounting means for mounting said first and second pluralities of fiber optic splicing members to said base.

7. The apparatus according to claim 6 wherein said base includes an entrance end provided with a plurality of grooves for receiving said input lead of said individual fiber optic signal splitter and for receiving said output leads of said second plurality of optical fiber splitters, and wherein said cover has an entrance end provided with a pair of outwardly extending members for overlying and covering said grooves.

8. The apparatus according to claim 7 wherein each of said grooves is provided with a cavity for receiving material for surrounding said leads, for hardening and for providing strain relief to said leads.

9. The apparatus according to claim 6 wherein said housing includes an entrance end and wherein said apparatus further comprises a panel and a plurality of fiber optic connectors, said panel mounted to said base at said entrance end and said connectors mounted to said panel, said connectors equal in number to said input and output leads and for facilitating connection of said leads to other optical fibers.

10. The apparatus according to claim 6 wherein said apparatus further comprises apparatus for storing and organizing spliced optical fibers, said apparatus for storing and organizing spliced optical fibers including a base and a cover mounted to said base, said base provided with a plurality of splice holder apparatus for receiving splices between an optical fiber to be spliced to said input lead of said individual fiber optic signal splitter and splices between other optical fibers to be spliced to said output leads of said splitters of said second plurality of fiber optic signal splitters, said fiber optic signal splitter apparatus and said apparatus for storing and organizing spliced optical fibers provided with cooperative mounting means for mounting said apparatus for storing and organizing spliced optical fibers to said entrance of said fiber optic signal splitter apparatus.

11. Fiber optic signal splitter apparatus, comprising:

first fiber optic signal splitter means for receiving an incoming fiber optic signal and for splitting said incoming fiber optic signal into a first plurality of fiber optic signals;

second fiber optic signal splitter means and fiber optic splicing means; and said fiber optic splicing means for splicing said first plurality of fiber optic signals to said second fiber optic signal splitter means and said second fiber optic signal splitter means for receiving and splitting said first plurality of fiber optic signals into a plurality of output fiber optic signals greater in number than said first plurality of fiber optic signals.

12. Method of splitting a fiber optic signal, comprising the steps of:

splitting a fiber optic signal into a first plurality of fiber optic signals;

splicing said first plurality of fiber optic signals to a first plurality of optic fiber signal splitters equal in number to said first plurality of fiber optic signals to cause said first plurality of fiber optic signal splitters to split said first plurality of fiber optic signals into a second plurality of fiber optic signals larger in number than said first plurality of fiber optic signals; and splicing said second plurality of fiber optic signals to a second plurality of fiber optic signal splitters equal in number to said second plurality of fiber optic signals to cause said second plurality of fiber optic signal splitters to split said second plurality of fiber optic signals into a third plurality of fiber optic signals greater in number than said second plurality of fiber optic signals.

13. Method of splitting a fiber optic signal, comprising the steps of:

providing an individual fiber optic signal splitter and transmitting a fiber optic signal to said splitter to split said incoming fiber optic signal into a first plurality of fiber optic signals;

providing a first plurality of fiber optic signal splitters equal in number to said first plurality of fiber optic signals;

providing a first plurality of fiber optic splicing member equal in number to said first plurality of fiber optic signals and utilizing said first plurality of splicing member to splice said first plurality of fiber optic signals to said first plurality of fiber optic signal splitters to split said first plurality of fiber optic signals into a second plurality of fiber optic signals greater in number than said first plurality of fiber optic signals;

providing a second plurality of fiber optic signal splitters equal in number to said second plurality of fiber optic signals;

providing a second plurality of fiber optic splicing member equal in number to said second plurality of fiber optic signals and utilizing said second plurality of fiber optic splicing member to splice said first plurality of fiber optic signals to said second plurality of fiber optic signal splicing member to split said second plurality of fiber optic signals into a third plurality of fiber optic signals larger in number than said second plurality of fiber optic signals.

* * * * *